United States Patent [19]

Maunula et al.

[11] Patent Number: 5,071,634
[45] Date of Patent: Dec. 10, 1991

[54] PROCESS FOR THE PREPARATION OF HYDROGEN PEROXIDE (I)

[75] Inventors: Teuvo Maunula; Eva-Liisa Mustonen; Ilkka Turunen, all of Oulu; Pirkko Virta, Vihtavuori, all of Finland

[73] Assignee: Kemira Oy, Helsinki, Finland

[21] Appl. No.: 469,281

[22] Filed: Jan. 24, 1990

[30] Foreign Application Priority Data

Jan. 27, 1989 [FI] Finland .................................. 890429

[51] Int. Cl.$^5$ ............................................ C01B 15/023
[52] U.S. Cl. ................................. 423/588; 366/336; 366/337; 366/338; 366/339; 422/224; 422/241
[58] Field of Search ................ 423/588; 422/241, 224; 366/336, 337, 338, 339

[56] References Cited

U.S. PATENT DOCUMENTS

| | | | |
|---|---|---|---|
| 2,063,596 | 12/1936 | Feiler | 422/241 |
| 2,531,287 | 11/1950 | Merrill et al. | 423/376 |
| 3,112,215 | 11/1963 | Ruosch et al. | 423/376 |
| 3,286,992 | 11/1966 | Armeniades et al. | 366/339 |
| 3,372,987 | 3/1968 | Kronacher | 423/376 |
| 3,423,176 | 1/1969 | Kabisch et al. | 423/588 |
| 4,220,416 | 9/1980 | Brauner et al. | 366/337 |
| 4,313,680 | 2/1982 | Honnen | 366/337 |
| 4,387,081 | 6/1983 | Voigt et al. | 423/376 |
| 4,428,923 | 1/1984 | Kunkel et al. | 423/588 |
| 4,444,731 | 4/1984 | Konoki et al. | 422/241 |
| 4,552,748 | 11/1985 | Berglin et al. | 423/588 |
| 4,792,229 | 12/1988 | Frohnert et al. | 366/336 |
| 4,902,418 | 2/1990 | Ziegler | 366/337 |

Primary Examiner—Wayne A. Langel
Attorney, Agent, or Firm—Dressler, Goldsmith, Shore, Sutker & Milnamow, Ltd.

[57] ABSTRACT

The invention relates to a process for the production of hydrogen peroxide by the anthraquinone process. A reaction mixture into which there are fed hydrogen or a hydrogen-containing gas and a working solution, i.e. an anthraquinone derivative in an organic solvent, is circulated via a tubular static mixing zone (9) which is continuous or comprises several parts, in order to hydrogenate the anthraquinone derivative in the presence of a solid catalyst, and by removing hydrogenated working solution (13) and gas (11) from the circulating reaction mixture (8). According to the invention, the reaction mixture (14) is circulated (8) via a catalyst-coated static mixing zone (9), where it is simultaneously both mixed and catalyzed.

5 Claims, 1 Drawing Sheet

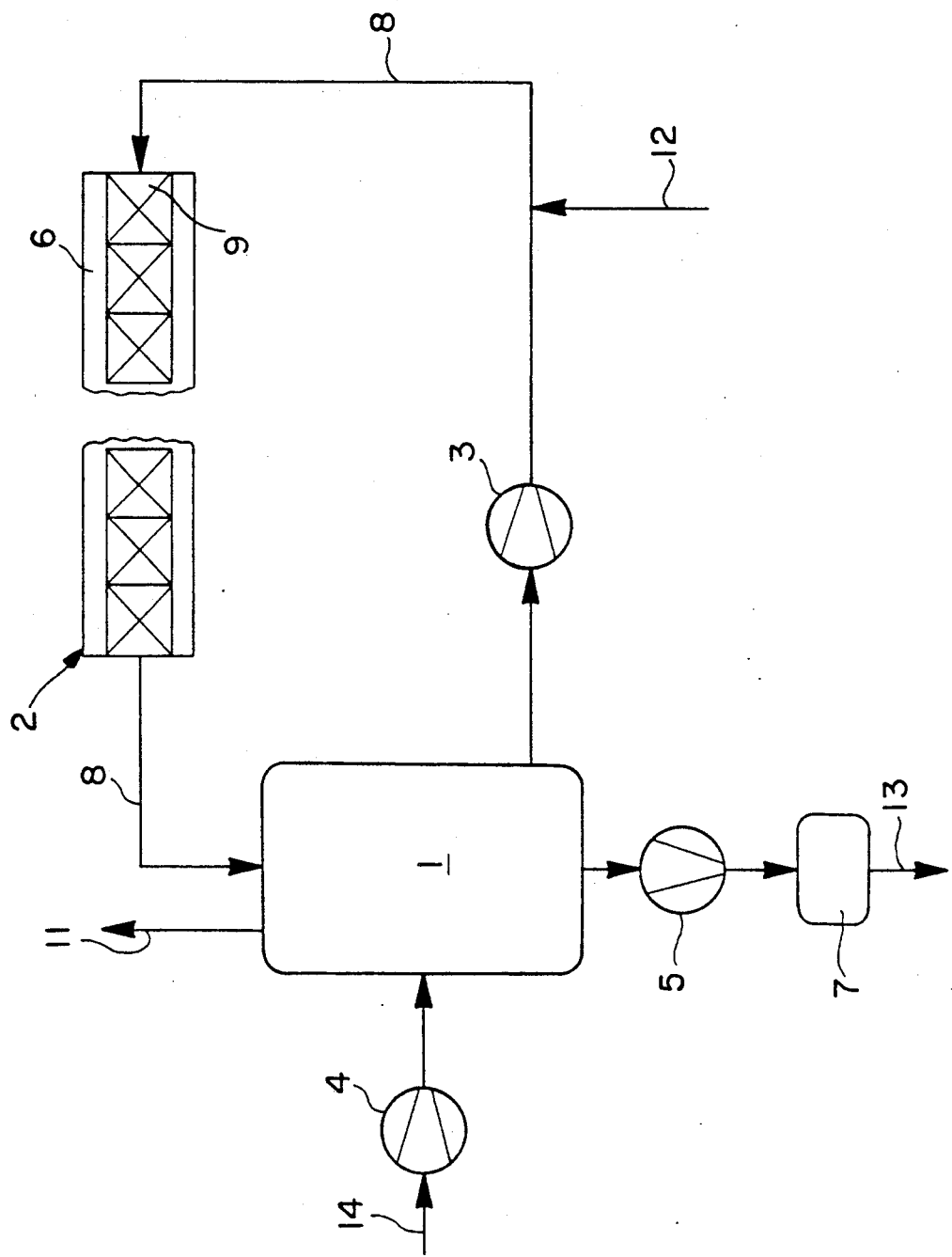

ial process,

PROCESS FOR THE PREPARATION OF HYDROGEN PEROXIDE (I)

A process for the preparation of hydrogen

The present invention relates to a process for the preparation of hydrogen peroxide by the anthraquinone process, and more particularly to its partial process, namely hydrogenation. Quite specifically the present invention relates to a process in which a reaction solution is circulated into which hydrogen or a hydrogen-containing gas and a working solution, i.e. an anthraquinone derivative in an organic solvent, are fed via a tubular static mixing zone which is either continuous or made up of several parts, in order to hydrogenate the anthraquinone derivative in the presence of a solid catalyst and by removing hydrogenated working solution and gas from the circulating reaction mixture. In addition the present invention relates to a tubular static mixer comprising one or more parts and to the use of the mixer in the process mentioned above.

It is known that hydrogen peroxide can be prepared by the so-called anthraquinone process. In this process an anthraquinone derivative is dissolved in a solvent comprising one or more components. The solution thus prepared is called the working solution. In the preparation of hydrogen peroxide, the working solution is first fed to the hydrogenation step. During this step the anthraquinone derivatives are hydrogenated, in the presence of a catalyst, to the corresponding anthrahydroquinone derivatives. Thereafter the hydrogenated working solution is directed to oxidation, during which oxygen or an oxygen-containing gas is introduced into it, whereupon hydrogen peroxide is formed in the solution. The principal reactions of the anthraquinone process are shown below:

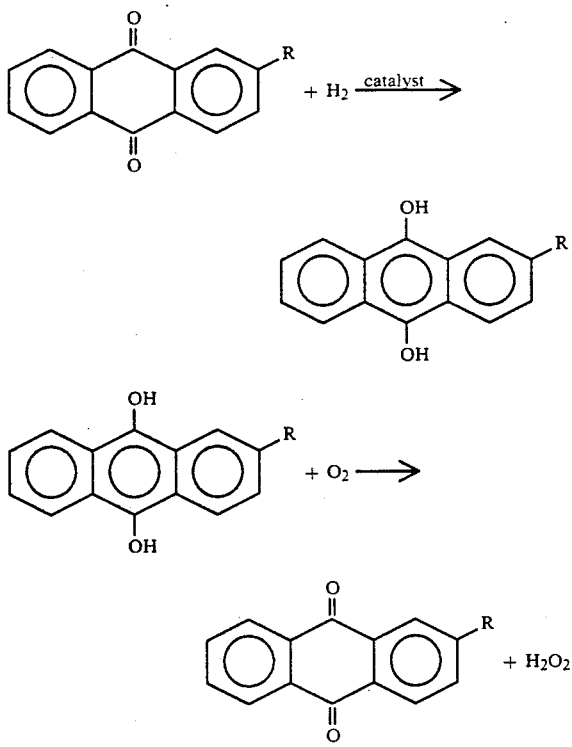

The working solution which contains hydrogen peroxide is fed to the extraction step, in which the hydrogen peroxide is caused by extraction to pass from the working solution into an aqueous solution. The extracted working solution is dried by removal of excess water and recycled to the beginning of the cyclic process, i.e. to hydrogenation. The aqueous solution of hydrogen peroxide, obtained by extraction, is purified and concentrated.

The hydrogenation described above is a demanding step in the anthraquinone process. High activity and high selectivity are required of the hydrogenation catalyst. The conversion and selectivity of the reaction in the hydrogenation step are dependent on the partial pressure of hydrogen, the temperature, the concentrations of the reacting components, the catalyst, and the flow conditions in the reactor. Secondary reactions may decrease the quantity of the anthraquinone derivatives which produce hydrogen peroxide. Both suspension reactors and fixed-bed reactors have been used for the hydrogenation.

The suspended catalysts used have included porous so-called palladium black, palladium absorbed into a carrier (for example alumina, activated carbon), and Raney nickel. The porous catalyst is suspended and the hydrogen is dispersed into the working solution in, for example, a mixing-tank reactor or a tubular reactor. In a tubular reactor the mixing is affected by the high linear velocity of the working solution. Usually the linear velocities are over 3 m/s and below 10 m/s in an open tube (U.S. Pat. No. 4,428,923). Mixing has also been improved by using as a reactor tube an alternately converging and expanding tube (U.S. Pat. 3,423,176, Käbisch et al.).

From FI Patent Application 864 971 there is additionally known a process of the type mentioned in the preamble, in which a reaction mixture which contains hydrogen, working solution and a solid suspended catalyst is circulated in a tubular reactor system which is equipped with a static mixer which is continuous or made up of several parts. The pressure prevailing in the tube system is below 15 bar and the temperature below 100° C. In this process the working solution is circulated in the reaction tube system at a flow velocity which is below 3 m/s.

The contact surfaces and contact periods of the catalyst, the working solution and the hydrogen gas are important for the hydrogenation reaction. By using a stationary, solid catalyst in the hydrogenation the contact period in the catalyst reaction can be shortened, whereby the proportion of secondary reactions is decreased. The absence of the expensive filtration step is a significant advantage of using a fixed catalyst bed rather than a suspended catalyst. The filtration may be problematic also technically, since the catalyst particles are small.

A suspended catalyst is left partly unexploited in the hydrogenation reaction, since for a large proportion of the time it is in a hydrogen-free part of the process cycle, for example in the circulation tank, or it may adhere to the process cycle. Also, a suspended catalyst is more sensitive to sintration and to mechanical wear.

In fixed-bed reactors, carrier pellets and so-called honeycomb catalysts have been used (Berglin et al., U.S. Pat. 4,552,748). The carrier used has usually been active alumina, but also other porous carriers having a large specific surface can be used, for example $SiO_2$ or activated carbon. A noble metal, usually palladium, has been absorbed as the active component into the carrier.

Only some kind of after-filtration for the separation, from the working solution, of particles detached from the bed is used in the fixed-bed reactor before the oxidation step.

In fixed-bed reactors there are usually used pellets (diameter usually 0.2–10 mm) installed between sieve sheets or nets. In pellets as large as this, the transfer of material into the deepest pores and out of them is slow, for which reason the active metal in the inner parts of the pellets remains unexploited in the reaction. Likewise, the pressure loss increases to a high level, and canalization of the flows occurs in these freely packed catalyst beds. The reduction gas also tends to separate into a phase of its own, whereupon the hydrogenation velocity decreases. Special attention must be paid in order that no catalytic poisons will pass into the working solution or into the reduction gas.

The so-called honeycomb catalyst is made up of a cellular support structure having parallel canals. The porous carrier is fixed as a thin layer on the support structure, and furthermore a noble metal is absorbed into it. A reactor working according to a principle such as this has the disadvantage of a poor mixing of the hydrogen with the working solution and possibly the separation of the gas bubbles into a phase of their own. Heat transfer from the inner parts of the honeycomb remains poor, in which case the temperature therein may rise too high, a situation which increases the quantity of undesirable byproducts.

One step limiting hydrogenation in fixed-bed reactors is the passage of hydrogen from a gas bubble into the working solution. The rate of the passage of hydrogen depends on the size of the hydrogen bubbles in the working solution. The smaller the bubbles in which the hydrogen is in the solution, the greater the total surface area of the interface between the working solution and the gas phase. The mixing of hydrogen with the working solution has been improved by using static mixers at a point before the fixed-bed reactor (U.S. Pat. No. 4,428,922). In this manner the hydrogen is in small bubbles in the working solution upon entering the reactor, but as a result of the canalization in the reactor the dispersion of the gas weakens.

A pre-mixing reactor in which the working solution is saturated with respect to hydrogen has also been used at a point before the hydrogenation (U.S. Pat. No. 2,837,411).

The purpose of the present invention is thus to provide a process and an apparatus for the production of hydrogen peroxide by the anthraquinone process, in which the disadvantages of prior-art processes and apparatuses have been eliminated. The main characteristics of the invention are given in the accompanying claims.

In the process according to the invention, a reaction mixture comprising hydrogen or a hydrogen-containing gas and the working solution is thus caused to circulate in a constant-diameter or alternately converging and expanding tubular reactor system which is installed horizontally or vertically and is equipped with a static mixer which is continuous or comprises several parts and is coated with a catalytic substance, the reaction mixture being simultaneously mixed and catalyzed in the mixer. The tubular hydrogen has time to react before reaching the end of the tubular reactor. Thus reduction gas need not be circulated in the reactor.

The static mixer according to the invention comprises a support structure of a metallic, ceramic, polymeric or other corresponding material, to the surface of which a porous carrier has been fixed. The carrier comprises, for example, alumina, $SiO_2$, silicates or activated carbon. A metal active in hydrogenation, for example palladium, platinum, rhodium, nickel or a mixture of these, has been absorbed into the carrier.

In the reactor according to the invention, a sufficient transfer of material between the gas and the liquid and a sufficient transfer of heat from the reactor mixture to the tube wall are achieved by means of static mixers, which have been described in the following publications, for example: Chem.-Ing.-Tech. 52 (1980), 4, pp. 285–291; Chem. Eng. Prog. 82 (July 1986), 7, pp. 42–48, and 20 (May–June 1986), 3, pp. 147–154; Perry, R. H. and Chilton, C. H., Chemical Engineer's Handbook, 5, New York: McGraw-Hill (1973) Section 19, p. 22. Likewise, axial mixing is minimized and the temperature and concentration profiles in the cross sectional area of the tube are made even.

The reaction occurs in a thin catalyst layer of 5–300 $\mu$m on the surface of the mixer. The layer being thin, the proportion of yield-decreasing secondary reactions will remain small, since the retention times of reagents and reaction products in the pores are short. Likewise, the catalytically active metal will be used efficiently in the thin catalyst layer. For this reason the catalyst layer according to the invention is more advantageous than a fixed bed made up of pellets.

In contrast to the honeycomb reactor according to U.S. Pat. No. 4,552,748, in which the catalyst pieces form mutually parallel, equally long canals with no mixing effect, in the reactor according to the invention its structures serve not only as fixing surfaces for the catalyst but also as mixers, the static mixer having catalyst-coated flow baffles mutually in different directions, which effectively distribute the flow over the entire cross sectional area of the reactor. Such an effect is not present in the reactor according to U.S. Pat. No. 4,552,748, which requires separate mixers for dispersing and dissolving the hydrogen into the working solution.

In the present invention it is quite essential that the reaction solution is mixed while it is being catalyzed, since it has been observed that the hydrogenation reaction is not as effective if the catalyzing and the mixing are carried out in different steps, as in U.S. Pat. No. 4,552,748.

Owing to the mixing, the transfer of heat and material between the liquid and the catalyst surface is more rapid than in honeycomb structures consisting of straight, parallel canals. By means of the catalyst the linear velocities in the reactor may be lowered to below 3 m/s, since the static mixers disperse the hydrogen into the working solution even at low linear velocities, for example within the range 0.1–1.5 m/s. At these velocities the pressure loss and the mechanical wear of the catalyst coating are slight.

The catalyst activities in the static mixer according to the present invention remain nearly unchanged for even long periods. This is in part due to a relatively open flow, in which case extensive impurities cannot adhere to the catalyst surface, the flow rinsing the canal walls clean. Likewise, the nearly anhydrous liquid phase and the oxygen-free gas phase promote the maintenance of the activity of the metal.

The length of the reactor is dependent on the mixer type used. When the canals of the static mixer are smaller, the geometric surface area of the mixer is greater, whereupon more catalyst layer per volume unit can be bound, but at the same time the dynamic pressure loss in the mixer will be greater. Thus an optimum size can be found for the mixer canals.

By means of the invention, a high hydrogen peroxide yield is obtained as calculated in proportion to the active metal. This is due, first, to the fact that all of the catalyst is in that part of the reactor system in which the hydrogenation reaction takes place. In addition, the thin catalyst layer is advantageous for the exploiting of the active metal.

A more important advantage as compared to the closest comparable inventions is the method of mixing the hydrogen and the working solution, advantageous in terms of the transfer of material and heat. Thus, uniform conditions are produced, which are advantageous for the selectivity and speed of the hydrogenation reaction. By using a thin catalyst layer, the active metal can be used effectively in the hydrogenation and, furthermore, the contact period between the reagents and the catalyst remains short, a factor which decreases the quantity of byproducts.

The hydrogenation process according to the invention can be implemented on an industrial scale so that the reduction is carried out in its entirety within an advantageous pressure range. The pressure in the reactor is maintained within the range 1-15 bar, preferably 2-5 bar. The temperature of the working solution is maintained within the advantageous temperature range 40°-60° C., for example in small-scale hydrogenation by jacket cooling of the reactor.

The invention is described below in greater detail with reference to the accompanying drawing, which depicts diagrammatically the hydrogenation process according to the invention.

The hydrogenation step comprises a circulation tank 1, into which the working solution 14 to be hydrogenated is fed by means of a pump 4. The working solution is recycled to the circulation tank 1 by means of a pump 3 in the tube system 8 via a hydrogenation reactor 2 equipped with one or more static mixers 9 coated with a catalytic material. The hydrogenation reactor 2 is equipped with a cooling jacket 6, but it is clear that the cooling can be arranged in other ways as well. The working solution 14 to be hydrogenated can also be fed directly into the circulation tube system 8. Hydrogen is introduced from a tube 12 into the hydrogenation circulation tube system at a point somewhat before the hydrogenation reactor 2, and the exhaust gases are removed through a tube 11, which is in the upper section of the circulation tank 1. Hydrogenated working solution is removed through a tube 13 connected to the lower section of the circulation tank 1 and is fed via a pump 5 and an after-filter 7 to oxygenation. The hydrogenation conversion can be affected by adjusting the feeding rate of hydrogen 12, the pressure in the reactor, and the liquid flow 8 through it.

EXAMPLE

In the small-scale batch experiment which was carried out, a working solution was used which contained 2-ethylanthraquione 100 g/l. The solvent used was a mixture of aromatic hydrocarbons and an organic phosphorus compound. 10 static mixers coated with a catalytic material and having a length of 40 mm had been installed in the tubular reactor system, the length of which was approximately 400 mm and diameter 39 mm, in which case the reaction mixture was distributed effectively in relation to the cross sectional area of the tube, being mixed and at the same time catalyzed. A layer of about 50 micrometers of porous gamma-aluminum oxide carrier had been fixed to the surface of the metallic static mixer. Palladium, in total approximately 0.5 percent by weight, had been absorbed into the aluminum oxide layer.

The flow rate of the working solution was approximately 2000 l/h, which corresponded to a linear velocity of 0.5 m/s. The temperature was 50° C. and the pressure at the beginning of the reactor was 4.0 bar.

Hydrogen was fed into the reactor at 55 l/h (NTP), only part of which was consumed in the reactor. The production of hydrogen peroxide in the reactor was on average 50 kg/(kg palladium) per hour.

We claim:

1. A process for the production of hydrogen peroxide by the anthraquinone process by circulating a reaction mixture into which there are fed hydrogen or a hydrogen-containing gas (12) and a working solution (14) via an oblong static mixing zone (2) having one or more baffle elongates in order to hydrogenate the anthraquinone derivative in the presence of a solid catalyst, and by removing hydrogenated working solution (13) and gas (11) from the circulating reaction mixture, characterized in that the reaction mixture (8) is mixed, while it is being catalyzed, by circulating the reaction mixture via said catalyst-coated static mixing zone (2, 9).

2. A process according to claim 1, characterized in that in the catalyst-coated static mixing zone (2, 9) a pressure is maintained which is 1-15 bar temperature is maintained which is below 100° C.

3. A process according to claim 1 or 2, characterized in that the reaction mixture (8) is circulated through the catalyst-coated static mixing zone (2, 9) at a velocity of 0.1-1.5 m/s.

4. A process according to claim 2, characterized in that the pressure is maintained between 2 and 5 bar.

5. A process according to claim 2 or 4, characterized in that the temperature is maintained between 40 and 60° C.

* * * * *

UNITED STATES PATENT AND TRADEMARK OFFICE
CERTIFICATE OF CORRECTION

PATENT NO. : 5,071,634

DATED : December 10, 1991

INVENTOR(S) : Teuvo Maunula, Eva-Liisa Mustonen, Ilkka Turunen, Pirkko Virta

It is certified that error appears in the above-identified patent and that said Letters Patent is hereby corrected as shown below:

Column 1, delete line 5.

Column 3, line 64, after "tubular" insert --reactor can simply be dimensioned to be so long that the--.

Column 6, line 7, "2-ethylanthraquione" should be --2-ethylanthraquinone--.

Column 6, line 35 (claim 1, line 6), "elongates" should be --elements--.

Signed and Sealed this

Thirtieth Day of March, 1993

Attest:

STEPHEN G. KUNIN

Attesting Officer

Acting Commissioner of Patents and Trademarks